United States Patent [19]

DeMartino et al.

[11] Patent Number: 5,044,725

[45] Date of Patent: * Sep. 3, 1991

[54] POLYMERIC THIN FILM WAVEGUIDE MEDIA

[75] Inventors: Ronald N. DeMartino, Wayne; Hyun-Nam Yoon, New Providence; James B. Stamatoff, Westfield, all of N.J.

[73] Assignee: Hoechst Celanese Corp., Somerville, N.J.

[*] Notice: The portion of the term of this patent subsequent to Oct. 25, 2005 has been disclaimed.

[21] Appl. No.: 614,904

[22] Filed: Nov. 16, 1990

Related U.S. Application Data

[63] Continuation of Ser. No. 468,676, Jan. 23, 1990, Pat. No. 5,002,361, which is a continuation-in-part of Ser. No. 915,179, Oct. 3, 1986, Pat. No. 4,915,491, which is a continuation-in-part of Ser. No. 822,090, Jan. 24, 1986, abandoned.

[51] Int. Cl.$^5$ .............................................. G02B 1/00
[52] U.S. Cl. ................................. 385/130; 350/96.13; 252/299.01; 252/299.3; 385/141
[58] Field of Search ............. 350/96.13, 96.34, 350 R; 252/299.01, 299.3

[56] References Cited

U.S. PATENT DOCUMENTS

| | | | |
|---|---|---|---|
| 4,631,328 | 12/1986 | Ringsdorf et al. | 526/259 |
| 4,779,961 | 10/1988 | DeMartino | 350/350 R |
| 4,795,664 | 1/1989 | DeMartino | 428/1 |
| 4,801,670 | 1/1989 | DeMartino et al. | 526/263 |
| 4,808,332 | 2/1989 | DeMartino et al. | 526/312 |
| 4,810,338 | 3/1989 | DeMartino et al. | 204/157.88 |
| 4,818,802 | 4/1989 | Choe | 526/305 |
| 4,822,865 | 4/1989 | DeMartino et al. | 252/299.01 |
| 4,824,219 | 4/1989 | Choe | 350/354 |
| 4,835,235 | 5/1989 | DeMartino et al. | 526/311 |
| 4,851,502 | 7/1989 | DeMartino | 528/176 |
| 4,855,376 | 8/1989 | DeMartino et al. | 526/311 |
| 4,865,430 | 9/1989 | DeMartino et al. | 350/376 |
| 4,867,538 | 9/1989 | Yoon et al. | 350/350 R |
| 4,868,250 | 9/1989 | DeMartino et al. | 525/479 |
| 4,882,402 | 11/1989 | Leslie et al. | 526/243 |
| 4,913,836 | 4/1990 | East | 252/582 |
| 4,913,844 | 4/1990 | DeMartino | 252/582 |
| 4,915,491 | 4/1990 | DeMartino et al. | 350/350 R X |
| 4,929,696 | 5/1990 | DeMartino et al. | 526/312 |
| 4,933,112 | 6/1990 | DeMartino et al. | 252/587 |
| 4,944,896 | 7/1990 | DeMartino et al. | 252/587 |
| 4,948,532 | 8/1990 | DeMartino et al. | 252/582 |
| 4,954,288 | 9/1990 | East | 252/299.01 |
| 4,962,160 | 7/1989 | DeMartino et al. | 525/404 |
| 4,963,633 | 10/1990 | DeMartino et al. | 526/323.2 |
| 4,978,476 | 12/1990 | Allen et al. | 252/299.01 |
| 5,002,361 | 3/1991 | DeMartino et al. | 350/96.34 |

OTHER PUBLICATIONS

*Liquid Crystal Polymers II/III*, Edited by M. Gordon, Springer-Verlag, 1984.
*Macromolecules*, "Optical and Nonlinear Optical Characterization of Molecularly Doped Thermotropic Liquid Crystalline Polymers", G. R. Meredith et al., 1982, vol. 15, pp. 1385–1389.

*Primary Examiner*—John D. Lee
*Assistant Examiner*—Stephen W. Barns
*Attorney, Agent, or Firm*—Michael W. Ferrell

[57] ABSTRACT

This invention provides polymeric thin film optical waveguide media which exhibit nonlinear optical response, and which have utility as an optical waveguide component in all-optical and electrooptical light switch and light modulator devices. An invention waveguide medium consists of a thin film of an amorphous organic polymer as illustrated by the following structure:

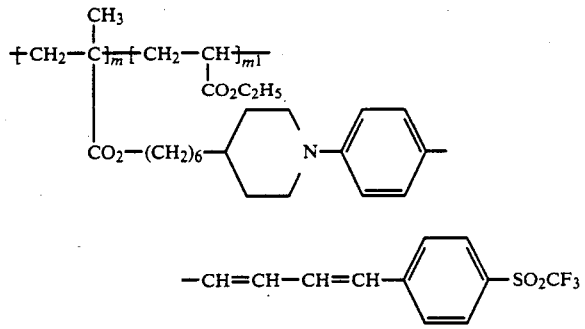

1 Claim, No Drawings

POLYMERIC THIN FILM WAVEGUIDE MEDIA

CROSS-REFERENCE TO RELATED PATENT APPLICATIONS

This application is a continuation of U.S. Ser. No. 468,676, filed Jan. 23, 1990, now U.S. Pat. No. 5,002,361, which in turn was a continuation-in-part of U.S. Ser. No. 915,179, filed Oct. 3, 1986, now U.S. Pat. No. 4,915,491, which in turn was a continuation-in-part of U.S. Ser. No. 822,090, filed Jan. 24, 1986, now abandoned.

BACKGROUND OF THE INVENTION

Polymers with a comb structure of pendant side chains are a new class of organic materials which exhibit interesting optical properties.

Comb-like liquid crystalline polymers are described in Eur. Polym. J., 18, 651 (1982); Advanced Polymer Science, Liquid Crystal Polymers II/III, Springer-Verlag, New York (1984), pages 215-220; and in U.S. Pat. Nos. 4,293,435 and 4,631,328. The disclosed polymeric structures have been developed for their mesogenic optical properties which have prospective utility in opto-electronic display devices.

In U.S. Pat. Nos. 4,694,066; 4,755,574; and 4,762,912 liquid crystalline polymers are described which have pendant side chains which exhibit nonlinear optical susceptibility, in addition to mesogenic properties. U.S. Pat. No. 4,792,208 discloses nonlinear optically responsive organic compounds and side chain polymers in which the molecular dipoles have an electron donor moiety linked through a conjugated $\pi$ bonding system to an electron accepter sulfonyl moiety. Japanese patent 88175834 discloses an acrylate polymer which has nitro(ethylhydroxyethylamino)azobenzene side chains.

Nonlinear optical properties of organic and polymeric materials was the subject of a symposium sponsored by the ACS division of Polymer Chemistry at the 18th meeting of the American Chemical Society, September 1982. Papers presented at the meeting are published in ACS Symposium Series 233, American Chemical Society, Washington, D.C. 1983.

Thin films of organic or polymeric materials with large second order nonlinearities in combination with silicon-based electronic circuitry have potential as systems for laser modulation and deflection, information control in optical circuitry, and the like.

Other novel processes occurring through third order nonlinearity such as degenerate four-wave mixing, whereby real-time processing of optical fields occurs, have potential utility in such diverse fields as optical communications and integrated circuit fabrication.

Liquid crystalline side chain polymers which exhibit nonlinear optical properties are suitable for application as a nonlinear optical component in optical light switch and light modulator devices. One disadvantage of a liquid crystalline side chain polymer optical medium is a loss of transmission efficiency due to light scattering by deviations from ideal mesogenic order.

There is continuing interest in the theory and practice of optically responsive polymers which are characterized by an oriented state of comb-like side chain structures.

There is also an increasing research effort to develop new nonlinear optical organic systems for prospective novel phenomena and devices adapted for laser frequency conversion, information control in optical circuitry, light valves and optical switches The potential utility of organic materials with large second order and third order nonlinearities for very high frequency application contrasts with the bandwidth limitations of conventional inorganic electrooptic materials.

Accordingly, it is an object of this invention to provide optically responsive monomers and polymers.

It is another object of this invention to provide polyvinyl copolymers having side chains which exhibit nonlinear optical response.

It is a further object of this invention to provide optical waveguide media comprising a thin film of an amorphous polymer with nonlinear optically-responsive pendant side chains which can be uniaxially aligned by an external field.

Other objects and advantages of the present invention shall become apparent from the accompanying description and examples.

DESCRIPTION OF THE INVENTION

One or more objects of the present invention are accomplished by the provision of a thin film optical waveguide medium comprising an amorphous polymer which exhibits a second order nonlinear optical susceptibility $\chi^{(2)}$ of at least about $1 \times 10^{-8}$ esu as measured at 1.34 $\mu$m excitation wavelength, and exhibits a light transmission optical loss of less than about one decibel per centimeter.

In another embodiment this invention provides a thin film optical waveguide medium comprising an amorphous polymer which exhibits a second order nonlinear optical susceptibility $\chi^{(2)}$ of at least about $1 \times 10^{-8}$ esu as measured at 1.34 $\mu$m excitation wavelength, and exhibits a light transmission optical loss of less than about one decibel per centimeter; wherein the polymer is characterized by recurring monomeric units corresponding to the formula:

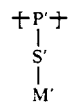

where P' is a polymer main chain unit; S' is a pendant spacer group having a linear chain length of between about 2-12 atoms; M' is an organic structure which exhibits second order nonlinear optical susceptibility $\beta$; and the polymer has a weight average molecular weight in the range between about 5000-200,000.

In a preferred an embodiment invention thin film optical waveguide medium consists of a side chain polymer which is characterized by an external field-induced orientation and alignment of pendant side chains.

In the above represented side chain polymer formula, the main chain can be a structural type such as polyvinyl, polyoxyalkylene, polysiloxane, polycondensation, and the like.

A present invention polymer having pendant side chains which exhibit nonlinear optical susceptibility $\beta$ is formed into a nonlinear optical medium, such as a transparent film or coating on a substrate. A polymer can be applied to a supporting substrate by conventional means, such as spin coating, spraying, Langmuir-Blodgett deposition, and the like.

A film or coating fabricated with a present invention polymer initially exhibits third order nonlinear optical susceptibility. A thin film optical waveguide medium of the present invention after fabrication is subjected to an external field to orient and align uniaxially the polymer side chains. In one method the polymer medium is heated close to or above the polymer glass transition temperature $T_g$, then an external field (e.g., a DC electric field) is applied to the medium of mobile polymer molecules to induce uniaxial molecular alignment of polymer side chains parallel to the applied field, and the medium is cooled while maintaining the external field effect.

By this method a present invention thin film optical waveguide medium has a stable uniaxial alignment of polymer side chains The poled optical medium exhibits a second order nonlinear optical susceptibility $\chi^{(2)}$. A present invention poled thin film optical medium is capable of exhibiting a $\chi^{(2)}$ level of $1\times10^{-8}$ esu or higher as measured at 1.34 μm excitation wavelength.

The term "electron-donating" as employed herein refers to substituents which contribute electron density to the $\pi$-electron system when the conjugated electronic structure is polarized by the input of electromagnetic energy.

The term "electron-withdrawing" as employed herein refers to electronegative organic substituents which attract electron density from the $p$-electron system when the conjugated electron structure is polarized by the input of electromagnetic energy.

Illustrative of electron-donating substituents are amino, alkylamino, dialkylamino, 1-piperidino, 1-piperazino, 1-pyrrolidino, acylamino, hydroxyl, thiolo, alkylthio, arylthio, alkoxy, aryloxy, acyloxy, 1,2,3,4-tetrahydroquinolinyl, and the like.

Illustrative of electron-withdrawing substituents are nitro, cyano, trifluoromethyl, acyl, carboxy, alkanoyloxy, aryloxy, carboxamido, alkoxysulfonyl, aryloxysulfonyl, and structures such as —CH=C(CN)$_2$, —C(CN)=C(CN)$_2$, —SO$_2$CF$_3$,

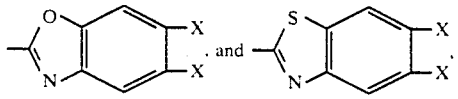

where X is —H, —CN, —NO$_2$ or —CF$_3$.

The term "external field" as employed herein refers to an electric, magnetic or mechanical stress field which is applied to a substrate of mobile polymer molecules, to induce dipolar alignment of the polymer molecules and/or polymer side chains parallel to the field.

The term "amorphous" as employed herein refers to a transparent polymeric optical medium which exhibits only short range translational and orientational order of internuclear distance vectors $r_{ij}$. Short range order refers to order in which there is preferred internuclear distances between nearest neighbor atoms as occurs in a liquid. This is distinct from long range order, in which atoms lie on preferred sites within a repeating unit cell with both three dimensional translational and rotational order as occurs in a crystalline material This is also distinct from order in which atoms occupy preferred sites which repeat with long range translational and/or rotational order in less than three dimensions for both translation and/or rotation as occurs in liquid crystalline materials or plastic crystals.

Long range order requires repetition over several unit cells. The number of unit cells determines the range of ordering. For crystals this repetition of unit cells is known as the crystallite size. Materials may possess long range translational and/or rotational order even if the order is defined within crystallites or domains in which there is no order between the crystallites or domains. For example, a crystalline powder has long range order as does an unoriented smectic liquid crystalline material. If the range of order approaches one unit cell, short and long range order cannot be distinguished but become identical in this limit.

Diffraction of X-rays from a material possessing short range translational order consists of broad halos of scattering which cannot be indexed on a regular reciprocal lattice. Materials with long range translational order exhibit broad or sharp diffraction depending upon the range of order, but in this case the scattering cannot be indexed on a regular reciprocal lattice in at least one direction.

Amorphous polymers display short range order and may be aligned so that there is preferred orientation. X-ray scattering from oriented amorphous materials show halos of scattering which are confined to arcs but cannot be indexed on a regular reciprocal lattice.

Certain liquid crystalline materials such as nematic liquid crystals or nematic liquid crystalline polymers also scatter X-rays into broad halos which do not occur along a regular lattice. These materials may be oriented or unoriented. Amorphous polymers may be distinguished from these liquid crystalline materials by their thermal behavior. Liquid crystalline materials display first or second order thermal phase transitions upon heating which may be observed by calorimetry.

Amorphous polymers do not display thermal phase transitions upon heating, but instead display a glass transition which may be observed by calorimetry.

In another embodiment this invention provides a thin film optical waveguide medium comprising an amorphous polymer which exhibits a second order nonlinear optical susceptibility $\chi^{(2)}$ of at least about $1\times10^{-8}$ esu as measured at 1.34 μm excitation wavelength, and exhibits a light transmission optical loss of less than about one decibel per centimeter; wherein the polymer is characterized by recurring monomeric units corresponding to the formula:

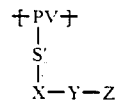

where PV is a main chain polyvinyl unit; S' is a pendant spacer group having a linear chain length of between about 2-12 atoms; X is an electron-donating group; Y is

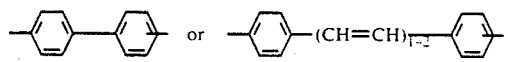

and Z is an electron withdrawing group; and the polymer has a glass transition temperature in the range between about 40°–250° C.

The polymer corresponding to the above represented formula can be a homopolymer or a copolymer.

The recurring PV monomer unit in the above formula can be a polymerized radical of vinyl compounds such as acrylate, vinyl carboxylate, substituted arylvinyl, and the like. When the invention polymer is a copolymer type, the PV monomer unit in the above formula is copolymerized with one or more vinyl monomers such as acrylate, vinyl halide, vinyl carboxylate, alkene, alkadiene, arylvinyl, and the like. The monomer species are exemplified by methacrylate, vinyl chloride, vinyl acetate, ethylene, propylene, isobutylene, 1-butene, isoprene, styrene, and the like.

In another embodiment this invention provides a thin film optical waveguide medium comprising an amorphous polymer which exhibits a second order nonlinear optical susceptibility $\chi^{(2)}$ of at least about $1 \times 10^{-8}$ esu as measured at 1.34 μm excitation wavelength, and exhibits a light transmission optical loss of less than about one decibel per centimeter; wherein the polymer is characterized by recurring monomeric units corresponding to the formula:

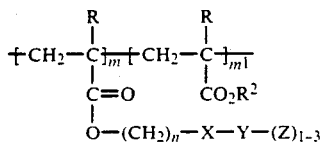

where and $m^1$ are integers which total at least 10; R is hydrogen or a $C_1$-$C_4$ alkyl; n is an integer having a value of 2-8; X is oxygen, sulfur or an amino or cycloamino group; $R^2$ is a $C_1$-$C_{12}$ alkyl or cycloalkyl group; Y is

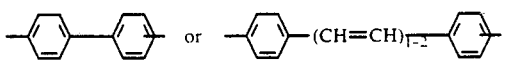

and Z is an electron-withdrawing group; and the polymer has a glass transition temperature in the range between about 50°-200° C.

Illustrative of $C_1$-$C_4$ alkyl, amino, cycloamino, $C_1$-$C_{12}$ alkyl and cycloalkyl groups are methyl, ethyl, propyl, butyl, 2-butyl, pentyl, octyl, decyl, —NH—, —NR—,

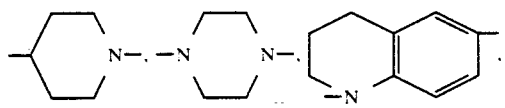

cyclopentyl, cyclohexyl, and the like.

In a preferred embodiment this invention provides a thin film optical waveguide medium comprising an amorphous polymer which exhibits a second order nonlinear optical susceptibility $\chi^{(2)}$ of at least about $1 \times 10^{-8}$ esu as measured at 1.34 μm excitation wavelength, and exhibits a light transmission optical loss of less than about one decibel per centimeter; wherein the polymer is characterized by recurring , monomeric units corresponding to the formula:

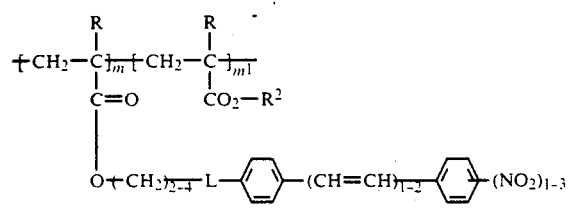

where m and $m^1$ are integers which total at least 10; R is hydrogen or $C_1$-$C_4$ alkyl; L is —$NR^1$— or

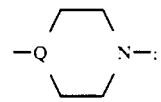

$R^1$ is hydrogen or a $C_1$-$C_4$ alkyl group; Q is nitrogen or a —CH— radical; $R^2$ is a $C_1$-$C_{12}$ alkyl or cycloalkyl group; the m monomer comprises between about 30-70 mole percent of the total monomers; and the polymer has a glass transition temperature in the range between about 50°-200° C.

In another embodiment this invention provides a thin film optical waveguide medium comprising an amorphous polymer which exhibits a second order nonlinear optical susceptibility $\chi^{(2)}$ of at least about $1 \times 10^{-8}$ esu as measured at 1.34 μm excitation wavelength, and exhibits a light transmission optical loss of less than about one decibel per centimeter; wherein the polymer is characterized by recurring monomeric units corresponding to the formula:

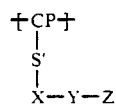

where CP is a main chain condensation polymer unit; and S', X, Y and Z are a previously defined.

In another embodiment this invention provides a thin film optical waveguide medium comprising amorphous polymer which exhibits a second order nonlinear optical susceptibility $\chi^{(2)}$ of at least about $1 \times 10^{-8}$ esu as measured at 1.34 μm excitation wavelength, and exhibits a light transmission optical loss of less than about one decibel per centimeter; wherein the polymer is characterized by recurring monomeric units corresponding to the formula:

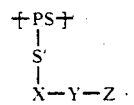

where PS is a main chain polysiloxane unit; and S', X, Y and Z are as previously defined.

Illustrative of a polysiloxane is a structure characterized by recurring monomeric units corresponding to the formula:

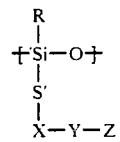

where R is a $C_1$-$C_{10}$ hydrocarbyl substituent; and S', X, Y and Z are as previously defined. Illustrative of hydrocarbyl groups are methyl, cyclohexyl and phenyl.

A present invention thin film optical waveguiding medium of an amorphous polymer has particular advantage in comparison with a medium of a liquid crystalline polymer. A present invention optical medium exhibits exceptional optical transparency, while a liquid crystalline medium exhibits a light scattering effect because of deviation from ideal crystalline order. The efficiency of light transmission in an optical waveguide is diminished by light scattering.

In another embodiment this invention provides a waveguide medium for optical modulation of light which comprises:

a. a thin film optical waveguide medium comprising an amorphous polymer which exhibits a second order nonlinear optical susceptibility $\chi^{(2)}$ of at least about $1\times10^{-8}$ esu as measured at 1.34 μm excitation wavelength, and exhibits a light transmission optical loss of less than about one decibel per centimeter; and b. an upper cladding layer and a lower cladding layer, each of which consists of a transparent organic medium which has a lower index of refraction than the waveguiding thin film component.

In another embodiment this invention provides a thin film waveguide electrooptic light modulator which consists of a laminated assembly of substrates comprising:

a. a thin film optical waveguide medium comprising an amorphous polymer which exhibits a second order nonlinear optical susceptibility $\chi^{(2)}$ of at least about $1\times10^{-8}$ esu as measured at 1.34 μm excitation wavelength, and exhibits a light transmission optical loss of less than about one decibel per centimeter;

b. upper and lower cladding layers, each of which consists of an amorphous polymer medium which has an index of refraction between about 0.001-0.2 lower than the waveguiding thin film component, and which exhibits second order nonlinear optical susceptibility $\chi^{(2)}$; and c. electrodes which are positioned to apply an electric field to the assembly of waveguiding thin film and cladding layers.

For many applications a thin film waveguide has a single mode channel structure, such as a two channel directional coupling configuration.

For some device applications it is highly preferred that an invention waveguide medium has a spatial periodic structure for phase matching of propagating fundamental and harmonic light waves. The coherence length $l_c$ of the periodic polymeric medium is defined by the equation:

$$l_c = \frac{\pi}{\Delta\beta}$$

where $\Delta\beta$ is the propagation constant difference which is equal to $\beta_0(2\omega_1) - 2\beta_0(\omega_1)$, $\omega_1$ is the fundamental frequency, and subscript zero denotes the zero-ordered mode in the waveguide. The periodic structure can be bidirectional in the form of alternating zones of uniaxially aligned polymer chains, with the alternating zones having opposite directional alignments.

An optical device containing a present invention thin film waveguide medium as a nonlinear optical component can be a laser frequency converter, an optical interferometric waveguide gate, a wide-band electrooptical guided wave analog-to-digital converter, an optical parametric device, and the like, as described in U.S. Pat. No. 4,775,215.

The theory of nonlinear harmonic generation by frequency modulation of coherent light is elaborated by A. F. Garito et al in Chapter 1, "Molecular Optics:Nonlinear Optical Properties Of Organic And Polymeric Crystals"; ACS Symposium Series 233 (1983).

As it is apparent from the foregoing description of the present invention thin film waveguide and device embodiments, an essential aspect of the present invention is the utilization of an amorphous polymer as the thin film waveguiding nonlinear optical medium, to the exclusion of liquid crystalline polymers which can be less efficient for the transmission of propagating light waves.

With respect to side chain polymers and copolymers for fabrication of thin film optical waveguide media, it is necessary to distinguish and select between closely related polymeric structures. As determined by steric effects, some side chain polymers and copolymers are amorphous and some are liquid crystalline in properties.

These factors are illustrated by the following observations in connection with the relationship between polymer structure and optical properties.

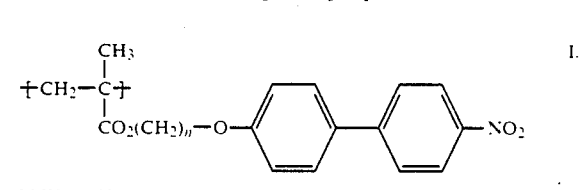

M.W. ≈ 9000

When n in formula I is 12, Differential Scanning Colorimetry (DSC) indicates a $T_g$ of 23° C., a liquid crystalline melt phase, and a clearing temperature of 79° C.

When n in formula I is 6, DSC indicates a $T_g$ of 45° C., a liquid crystalline melt phase, and a clearing temperature of 67° C.

When n in formula I is 3, DSC indicates a $T_g$ of 86° C., and no liquid crystalline melt phase is evident.

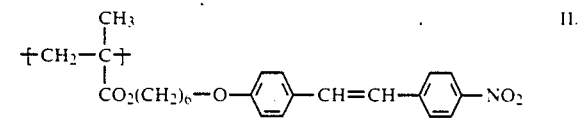

M.W. ≈ 10,000

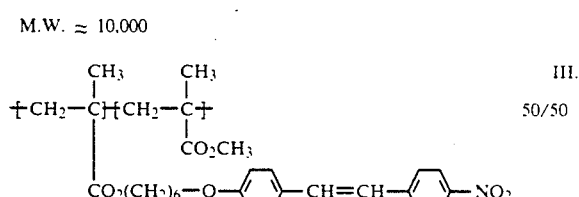

M.W. ≈ 10,000

The formula II homopolymer has a $T_g$ of 68° C., a liquid crystalline melt phase, and a clearing temperature of 146° C.

The formula III copolymer has a $T_g$ of 65° C., and no liquid crystalline melt phase is evident.

The formulas II-III demonstrate that a side chain homopolymer which exhibits liquid crystalline properties can be transformed into a copolymer which does not exhibit liquid crystalline properties. The homopolymer of formula II as a thin film waveguide medium exhibits a light transmission optical loss of greater than about one decibel per centimeter, and therefore is not suitable for purposes of the present invention. The copolymer of formula II as a thin film waveguide medium exhibits a light transmission optical loss of less than about one decibel per centimeter, and therefore is a qualified optical medium within the scope of the present invention embodiments since it also exhibits a second order nonlinear optical susceptibility of greater than $1 \times 10^{-8}$ esu when in a poled solid state.

The following examples are further illustrative of the present invention. The specific ingredients of polymer synthesis and the waveguide component fabrication are presented as being typical, and various modifications can be derived in view of the foregoing disclosure within the scope of the invention.

EXAMPLE I

This Example illustrates the preparation of amorphous homopolymer and an isotropic copolymer (25/75).

followed by saturated sodium bicarbonate, and the organic layer is filtered through cotton, and evaporated to dryness.

C. 4-(N-2-hydroxyethyl-N-ethylamino)cinnamaldehyde

To a solution of 235.3 g (1 mole) of 4-(N-2-acetoxyethyl-N-ethylamino)benzaldehyde in dimethylformamide is added 738.7 g (2.0 moles) of 1,3-dioxolan-2-ylmethyltributylphosphonium bromide in dimethylformamide, and the mixture is heated at 90° C. Potassium t-butoxide (224.4 g, 2.0 moles) is added, and heating is continued at 90° C. for 16 hours. After cooling to room temperature, the solution is poured into a sevenfold excess of water, the aqueous mixture is saturated with sodium chloride, and the solution is extracted with three portions of ether. The combined organics are dried over 4A sieves, filtered through cotton, and evaporated. The crude reaction product is dissolved in 3M HCl, and the reaction is stirred at room temperature for 16 hours. After neutralization with saturated sodium bicarbonate, the aqueous mixture is extracted with three portions of ether, and the combined organics are dried over 4A sieves, filtered through cotton, and evaporated

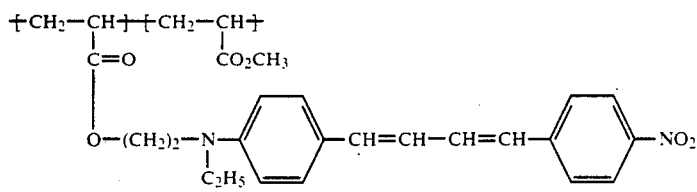

25/75

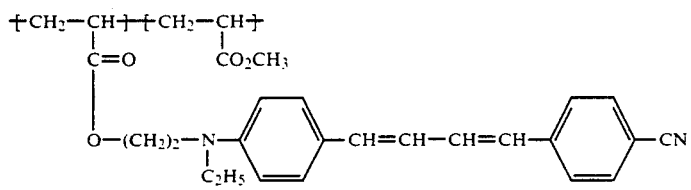

25/75

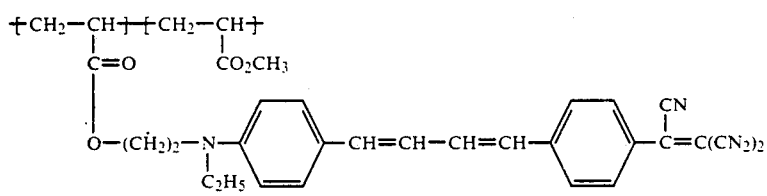

25/75

A. 4-(N-2-hydroxyethyl-N-ethylamino)benzaldehyde

To a three neck flask fitted with a mechanical stirrer, a thermometer, and a condenser, is added 124 g (1 mole) of 4-fluorobenzaldehyde, 89.1 g (1 mole) of 2-(N-ethylamino)ethanol, 138.2 g (1 mole) of anhydrous potassium carbonate, and dimethylsulfoxide. The mixture is heated at 95° C. for 3 hours. After cooling to room temperature, the solution is poured into a four-fold excess of ice water, and the solid product is collected by filtration and recrystallized from water.

B. 4-(N-2-acetoxyethyl-N-ethylamino)benzaldehyde

To a stirred solution of 193.2 g (1 mole) of 4-(N-2-hydroxyethyl-N-ethylamino)benzaldehyde in dichloromethane are added 153.1 g (1.5 moles) of acetic anhydride, 151.8 g (1.5 moles) of triethylamine, and 8.5 g (7 mole %) of 4-N,N-dimethylaminopyridine. The reaction mixture is stirred at room temperature for 16 hours. The product solution then is washed with cold 2N HCl to yield the cinnamaldehyde as an oil. The product is purified by flash chromatography (silica gel, 1:1 hexane:ethyl acetate).

D. 4-(N-2-hydroxyethyll-N-ethylamino)-4'-nitro-1,4-diphenyl-1,3-butadiene

A solution of 21.9 g (0.1 mole) of 4-(N-2-hydroxyethyl-N-ethylamino)cinnamaldehyde, 9.3 g (1mole) of aniline, and 0.19 g (1 mole 1%) of toluenesulfonic acid in toluene is heated at reflux for 17 hours with azeotropic removal of water. After the mixture is cooled to room temperature, 17.2 g (0.2 mole) of methacrylic acid and 18.1 g (0.1 mole) of 4-nitrophenylacetic acid are added to the solution, and the reaction is stirred at room temperature for 3 hours. The mixture then is heated at reflux for 16 hours. After cooling to room temperature, the solid diphenylbutadiene precipitates from solution and is collected by filtration and purified by recrystallization from ethanol.

E. Synthesis of acrylate monomer

A solution of 33.8 g (0.1 mole) of 4-(N-2-hydroxyethyl-N-ethylamino)-4'-nitro-1,4-diphenyl-1,3-butadiene, 12.6 g (0.1 mole) of acrylic anhydride, and 0.12 g (0.1 mole %) of 4-N,N-dimethylaminopyridine in pyridine is heated at 80° C. until the reaction is complete. After cooling to room temperature, the solution is poured into water, and the solid monomer is collected by filtration and purified by recrystallization from ethanol. The monomer exhibits a β of $121 \times 10^{-30}$ esu as measured at 1.92 μm excitation wavelength.

F. Formation of homopolymer

The acrylate monomer from above is dissolved in dimethylsulfoxide (10% solution by weight), and the solution is degassed with argon for 15 minutes). AIBN (1 mole %) is added to the mixture, and the resultant solution is degassed for an additional 15 minutes. The reaction then is heated at 70° C. and run under argon for 16 hours. After cooling to room temperature, the polymer is precipitated into methanol and collected by filtration. Purification is achieved by redissolving the polymer in methylene chloride and precipitating into acetone. The polymer has a $T_g$ of about 200° C.

G. Formation of 25/75 copolymer

The acrylate monomer (9.5 g, 0.025 mole) and methyl acrylate (6.46 g, 0.075 mole) are dissolved in dimethylsulfoxide (10% solution by weight of solutes), and the solution is degassed for 15 minutes. AIBN (1 mole %) is added to the mixture, and the solution is degassed for an additional 15 minutes. The reaction then is heated at 70° C. and run under argon overnight. After cooling to room temperature, the polymer is precipitated into methanol and collected by filtration. Purification is achieved by redissolving the polymer in tetrahydrofuran and precipitating into acetone. The recovered copolymer has a $T_g$ of about 145° C. A thin film of the copolymer exhibits a $\chi^{(2)}$ of about $3 \times 10^{-8}$ esu as measured at 1.34 μm excitation wavelength.

Following the same procedures as described above, three homopolymers and three copolymers are produced, except that in procedure D 4-nitrophenylacetic acid is replaced by 4-cyanophenylacetic acid, 4-dicyanovinylphenylacetic acid or 4-tricyanovinylphenylacetic acid, respectively.

EXAMPLE II

This Example illustrates the preparation of amorphous 4-[N-(2-methacroyloxyethyl)-N-methylamino]-2',4'-dinitrostilbene/methyl methacrylate copolymer (50/50).

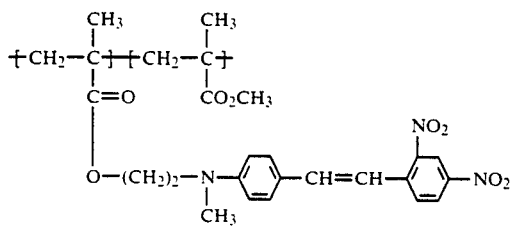

A. Aminobenzaldehyde Starting Material

A reactor is charged with 2-(methylamino)ethanol (134 g, 1.8 moles), 4-fluorobenzaldehyde (74.4 g, 0.6 mole), potassium carbonate (82.8 g, 0.6 mole) and dimethylsulfoxide (750 ml), and the mixture is heated at 95° C for 72 hours. The product mixture is cooled and poured into three liters of ice water The yellow solid that precipitates is filtered, washed with water, and dried in a vacuum oven, mp 72° C. The 4-[N-(2-hydroxyethyl)-N-methylamino]benzaldehyde product is recrystallized from water as needle-like crystals.

B. Schiff Base

4-[N-(2-hydroxyethyl)-N-methylamino]benzaldehyde (179 g, 1.0 mole) and toluene (1.2 liters) are charged to a reaction flask, and the reactor is purged with argon. The reaction is heated to reflux under argon, and water is removed with a Dean-Stark trap.

Methanesulfonic acid (0.2 ml) is added to the refluxing solution, and then aniline (102 g, 1.1 moles) is added dropwise, and the heating is continued until about 18 ml of water is removed.

A yellow precipitate forms on cooling, and is separated by filtration and dried, mp 111.9° C.

C. Stilbene Alcohol

A reactor is charged with 2,4-dinitrophenylacetic acid (45.23 g, 0.2 mole; Aldrich), toluene (360 ml), and Schiff base (50.9 g, 0.2 mole) as prepared above The reaction mixture is stirred at room temperature for one hour, then methacrylic acid (34.4 g, 0.4 mole) is added dropwise, and the reactor contents are heated at 75° C. for three hours and at 110° C. for two hours.

On cooling, the product separates as greenish crystals, mp 186°-189° C.

D. Acrylate Monomer

A reactor is charged with stilbene alcohol (24 g, 0.07 mole) as prepared above, pyridine (240 ml) and dimethylaminopyridine catalyst (1.71 g, 0.014 mole). The reactor contents are heated to 75° C., and methacrylic anhydride (29 ml, 0.195 mole) is added, and the reaction is conducted at 75° C. for 20 hours.

The product mixture is cooled, and poured into 750 ml of water. The resultant black crystalline precipitate is recovered by filtration and dried at 50° C. in a vacuum oven, mp 122°-125° C. The chemical structure of the product is consistent with a NMR spectral analysis. Recrystallization of the product from ethyl acetate/ethanol (3.2/1) yields shiny black crystals, mp 125°-126° C.

E. Copolymer (50/50)

A reactor is charged with 4.11 g (0.01 mole) of acrylate monomer as prepared above and dimethylsulfoxide (41 ml), and dry argon gas is bubbled into the solution. The reactor then is charged with methyl methacrylate (1.0 ml, 0.01 mole) and azodiisobutyronitrile (33 mg) under an argon purge. The reaction mixture is heated at 70° C. for 48 hours to form copolymer product.

The product mixture is poured into a 500 ml volume of methanol to precipitate the copolymer. The copolymer is collected, then dissolved in tetrahydrofuran and reprecipitated in a volume of methanol.

The glass transition temperature ($T_g$) is 134° C., and the weight average molecular weight is about 9000, as determined by size exclusion chromatography using Zorbax-PS bimodal columns with tetrahydrofuran as the mobile phase.

The copolymer is soluble in acetone, tetrahydrofuran or N-methylpyrrolidine, and insoluble in ethanol or toluene.

A thin film of the copolymer exhibits a $\chi^{(2)}$ of about $3.2 \times 10^{-8}$ esu as measured at 1.34 μm excitation wavelength.

EXAMPLE III

This Example illustrates the preparation of an amorphous copolymer (50/50).

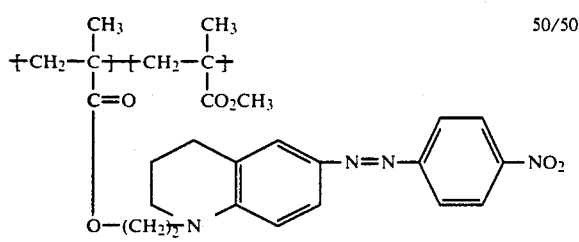

1,2,3,4-Tetrahydroquinoline (0.5 mole), 2-bromo-1-ethanol (2.5 moles), 250–500 ml of methanol and sodium carbonate (0.25 mole) are added to a flask fitted with a mechanical stirrer and condenser. The mixture is warmed to 80° C. for 16 hours, cooled to room temperature, and filtered to remove the solids. The filtrate is extracted with ether, and the ether is removed by rotary evaporation. The residue is vacuum distilled and separated into two fractions. The first fraction is excess bromoethanol (51°–53° C., 0.8 mm Hg). The second fraction is 1-(2-hydroxyethyl)-1,2,3,4-tetrahydroquinoline (110°–120° C., 0.4 mm Hg), in a 60% yield.

4-Nitroaniline (0.25 mole) is added to an aqueous solution of hydrochloric acid (10% v/v) which has been cooled to 0° C. in an ice bath. Acetic acid (300 ml) is added increase the solubility of the aniline. One equivalent of sodium nitrite is added to the aniline solution, while keeping the temperature below 10° C.

The 1-(2-hydroxyethyl)-1,2,3,4-tetrahydroquinoline (0.25 mole) is added directly to the diazonium salt solution and kept below 10° C. The pH is adjusted to 4 by adding sodium acetate. The ice bath is removed and the mixture is stirred for 3 hours at room temperature. The 1-(2-hydroxyethyl)-6-(4'-nitrophenylazo)-1,2,3,4-tetrahydroquinoline is precipitated into water, isolated, and washed with water. The yield is 60%.

The 1-(2-hydroxyethyl)-6-(4'40 -nitrophenylazo)-1,2,3,4-tetrahydroquinoline product (0.15 mole), dimethylaminopyridine (0.03 mole) and toluene are added to a dried flask fitted with an addition funnel, nitrogen bubbler, thermometer, and mechanical stirrer. The mixture under nitrogen is warmed to 75° C. in a thermostated oil bath. Acrylic anhydride (0.38 mole) which has been previously distilled is added slowly via the addition funnel. The solution is kept at 75° C. for 16 hours. The solution is cooled to room temperature and washed with aqueous sodium hydride. The toluene solution is dried over magnesium sulfate. The monomer is precipitated by the addition of hexane (60% yield).

The NLO-active monomer (0.1 mole, 39.44 g) is copolymerized with methyl methacrylate (0.1 mole) in 500 ml dired and purified dimethylsulfoxide with one mole % azobis(isobutyronitrile) IAIBN) under nitrogen. The monomers, solvent, and AIBN initiator are added to a round bottom flask, covered with a septum, and degassed by bubbling nitrogen for 15 minutes. The nitrogen is changed to a sparge and the flask is warmed to 75° C., and a positive nitrogen pressure is maintained in the flask. The monomers are polymerized for 12 hours at 75° C. The copolymer produce is precipitated into methanol and isolated by filtration (90% conversion).

The copolymer has a $T_g$ of about 112° C., and exhibits a $\beta$ of about $180 \times 10^{-30}$ esu as measured at 1.34 μm excitation wavelength. A thin film of the copolymer exhibits a $\chi^{(2)}$ of about $3 \times 10^{-8}$ esu as measured at 1.34 μm excitation wavelength.

EXAMPLE IV

This Example illustrates the construction and operation of an optical frequency converting waveguide module utilizing a present invention thin film optical waveguide medium.

A silicon dioxide-coated silicon wafer with a grating electrode is constructed by means of the following fabrication procedures.

A commercially available silicon dioxide-coated silicon wafer is placed in a Varian electron beam vacuum deposition system. A 0.1 μm layer of 99.999% purity aluminum is deposited on the wafer.

AZ-1518 positive photoresist (Hoechst) is spin-coated on the aluminum-coated wafer with a Solitec model 5100 coater. A 1.5 μm photoresist coating is achieved by spinning at 5000 rpm for 30 seconds. The photoresist coating is dried in a vacuum oven at 90° C. for 30 minutes.

The photoresist coating is patterned by placing the wafer in contact with a mask of the desired configuration in a Karl Suss model MJB3 mask aligner, and exposing the masked coating to 405 μm radiation (70 mJ/cm²).

The mask is removed, and a thin piece of silicon (1 cm × 2 cm) is placed on the surface of the patterned photoresist as a protective shield, and the combination is exposed to 70 mJ/cm² of 405 μm radiation. The patterned photoresist is developed with AZ Developer in water (1:1) over a period of 60 seconds, and the developing cycle is terminated by washing with deionized water.

The photoresist-coating of the wafer is baked in a vacuum oven at 120° C for 45 minutes. The exposed aluminum pattern is etched with type A etchant (Transene Corp.) at 50° C. for 20 seconds, and the etched surface is rinsed with deionized water.

The aluminum grating electrode surface of the wafer then is covered with a 1.5 μm cladding layer of 20% polyvinyl alcohol (75% hydrolyzed) in water by spin-coating at 5000 rpm for 30 seconds, and the cladding layer is dried in a vacuum oven at 110° C. for two hours.

A nonlinear optically active organic layer of 1.65 μm thickness is spin-coated on the cladding layer at 3000 rpm. The spin-coating medium is a 20% solution of an isotropic copolymer (50/50) of methyl methacrylate/4-(methacryloyloxy-2-hexoxy)-4'-nitrostilbene in trichloropropane. The organic layer is dried in a vacuum oven at 160° C. for one hour.

An upper cladding layer of 1.5 μm thickness is added by spin-coating a medium of polysiloxane (GR-651-L, Owens-Illinois Inc., 25% solids in 1-butanol) at 3500 rpm for 30 seconds. The cladding layer is dried in a vacuum oven at 110° C. for 35 minutes. A 0.055 μm coating of aluminum is deposited as an electrode layer on the upper cladding layer.

The fabricated waveguide is placed in a Mettler hot stage, and the unit is raised to 90° C at 1° C/min. A DC field of 70V/μm is applied across the waveguiding organic layer for ten minutes by means of the electrodes. The electric field is maintained while the waveguide sample is cooled to room temperature at 1° C./min. The $\chi^{(2)}$ nonlinear optical response of the waveguiding medium is $1\times10^{-8}$ esu as measured at 1.34 μm excitation wavelength.

The waveguide structure is cleaved at opposite ends to provide two sharp faces to couple light in and out of the waveguiding organic layer.

Cylindrical lenses are employed to focus and couple 1.34 radiation (0.01 mJ, 10 nsec wide pulse) into the waveguide. The waveguide is situated on a rotation stage, and phase-matched second harmonic generation is observed when the waveguide is rotated until the periodicity satisfies the value for phase-matching. Under the described operating conditions, a 0.5-1% amount of the fundamental beam is converted into observed second harmonic radiation.

A nonlinear optical response occurs in the fabricated device upon excitation with $TM_0^{\omega}$ radiation. As the sample is rotated, the grating matches the required periodicity for phase-matching and the second harmonic signal increases, demonstrating that phase-matched interaction has occurred between the fundamental mode $TM_0^{\omega}$ and its harmonic $TM_0^{2\omega}$.

EXAMPLE V

This Example illustrates the construction and operation of a polarization-insensitive waveguide electrooptic modulator utilizing a present invention thin film optical waveguide medium.

A commercially available silicon dioxide-coated silicon wafer is placed in a Varian electron beam vacuum deposition system. A 0.1 μm layer of 99.999% purity gold is deposited on the wafer.

AZ-1518 positive photoresist (Hoechst) is spin-coated on the aluminum-coated wafer with a Solitec model 5100 coater. A 1.5 μm photoresist coating is achieved by spinning at 5000 rpm for 30 seconds. The photoresist coating is dried in a vacuum oven at 90° C. for 30 minutes.

The photoresist coating is patterned in the form of lower electrode by placing the wafer in contact with a mask of the desired configuration in a Karl Suss model MJB3 mask aligner, and exposing the marked coating to 405 μm radiation (120 mJ/cm$^2$).

The mask is removed, and the patterned photoresist is developed with AZ-400k Developer in water (1:1) over a period of 45 seconds, and the developing cycle is terminated by washing with deionized water.

The photoresist-coating of the wafer is baked in a vacuum oven at 120° C. for 30 minutes. The exposed aluminum pattern is etched with type A etchant at 50° C. for 20 seconds, and the etched surface is rinsed with deionized water.

The aluminum electrode surface of the wafer is covered with a thin (1000 Å) protective polysiloxane layer, followed by a 1.5 μm lower organic cladding layer of a 20% solution of an amorphous copolymer (40/60) of methyl methacrylate/4-methacryloyloxy-2-ethoxy-4'-nitrostilbene in trichloropropane by spin-coating at 3000 rpm for 30 seconds, and the cladding layer is dried in a vacuum oven at 160° C. for one hour. The organic polymer has a molecular weight of about 30,000, and the cladding layer has a refractive index of 1.42.

The wafer then is exposed to reactive ion etching for 5 seconds to improve surface adhesion to subsequent layers. The etching conditions are five standard cubic centimeters per minute of $O_2$ flowing at 15 mtorr pressure, with 30 watts/6" diameter platten of 13.56 MHz r.f. power.

A nonlinear optically active thin film waveguide layer of 1.65 μm thickness is spin-coated on the lower cladding layer at 3000 rpm. The spin-coating medium is a 20% solution of an isotropic copolymer (50/50) of methyl methacrylate/4-(methacryloyloxy-2-ethoxy)-4'-nitrostilbene in trichloropropane. The organic layer is dried in a vacuum oven at 160° C. for one hour. The organic polymer has a molecular weight of about 30,000, and the thin film has a refractive index of 1.49.

A photoresist layer of AZ-1518 is spin-coated on the thin film waveguide layer at 4000 rpm, and the layer is exposed to 405 μm radiation (120 mJ/cm$^2$). A 0.2 μm layer of aluminum is deposited on the photoresist layer. The aluminum layer is coated with a photoresist layer, and the layer is patterned in the form of a Mach-Zehnder interferometric waveguide. The waveguide width is 5 μm. The Y junction channels separate and recombine at a full angle of 0.3 degrees.

The upper surface of the waveguide structure is exposed to reactive ion etching for 15 minutes under oxygen plasma conditions as previously described, to remove the multilayers down to the bottom silicon substrate, except for the photoresist coated pattern. The etching cycles also remove the photoresist coating from the aluminum pattern.

The aluminum and lower photoresist layers are removed by immersion of the waveguide structure in AZ-400k developer for one minute.

The substrate and the upper surface multilayer rib pattern are spin-coated with an upper organic cladding layer in the same manner as described above for the lower cladding layer.

A 0.1 μm layer of aluminum is deposited on the upper organic cladding layer, and following the pattern procedures described above an upper electrode is formed on the first channel, and a pair of parallel electrodes are formed on the second channel.

The waveguide structure is cleaved at opposite ends to provide two sharp faces to couple light in and out of the waveguiding thin film and cladding assembly.

Molecular orientation of the two polymeric waveguide assembly sections between the two sets of electrodes respectively is accomplished by application of applied electric fields by the sets of electrodes.

The fabricated waveguide device is placed in a Mettler hot stage, and the unit is raised to 90° C. at 1° C./min. A DC field of 70 V/μm and an AC voltage of 5 volts sine (10,000 t) is applied to one set of electrodes, and a variable DC voltage and an AC voltage of 5 volts sine (10,000 t) are applied to the other set of electrodes.

Objective lenses (10×) are employed to focus and couple 1.34 radiation μm (100 mW continuous wave) into the Mach-Zehnder waveguide. The output of the waveguide is passed through a 10× microscope objective, a polarization beam splitter, and then into two optical detectors. The detector signals are transmitted to two lock-in amplifiers.

Both amplifiers are tuned for a signal at 10,000 Herz, and the variable DC voltage to the first set of electrodes is adjusted until the signals in the two amplifiers are identical.

The waveguide unit is held at 90° C. for 20 minutes under the adjusted applied fields, and the applied fields are maintained while the waveguide unit is cooled to room temperature at 1° C./minute.

During operation of the waveguide, the effected light modulation is polarization-insensitive because the voltages applied to the two sets of electrodes are balanced to achieve equal phase modulation of the TE and TM modes of transmitted light.

What is claimed is:

1. A thin film optical waveguiding medium comprising a sidechain polymer having recurring units of the formula:

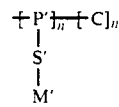

where P' is a polymer main chain unit, S' is a pendant spacer group having a linear chain length of between about 2-12 atoms; n' is an integer greater than 0, n is zero or an integer greater than 0, C is accordingly an optical comonomer unit and M' is an organic structure containing an electron donating group and an electron withdrawing group at opposing terminii of a conjugated II electron system.

* * * * *